US012583774B2

(12) United States Patent　　　　　(10) Patent No.:　US 12,583,774 B2
　　　Gantzer　　　　　　　　　　　　(45) Date of Patent:　　Mar. 24, 2026

(54) METHOD AND SYSTEMS FOR OXYGENATION OF WATER BODIES

(71) Applicant: Gantzer Water, LLC, Madison, WI (US)

(72) Inventor: Paul Gantzer, Madison, WI (US)

(73) Assignee: GANTZER WATER, LLC, Madison, WI (US)

( * ) Notice: Subject to any disclaimer, the term of this patent is extended or adjusted under 35 U.S.C. 154(b) by 753 days.

(21) Appl. No.: 17/938,164

(22) Filed: Oct. 5, 2022

(65) Prior Publication Data

US 2023/0023548 A1　　　Jan. 26, 2023

Related U.S. Application Data

(63) Continuation-in-part of application No. 17/301,127, filed on Mar. 25, 2021, now Pat. No. 11,702,352.

(51) Int. Cl.
C02F 1/72　　　　　(2023.01)
(52) U.S. Cl.
CPC .......... C02F 1/727 (2013.01); *C02F 2209/22* (2013.01); *C02F 2209/40* (2013.01); *C02F 2303/26* (2013.01)
(58) Field of Classification Search
CPC ........ C02F 2101/36; C02F 7/00; C02F 1/727; C02F 2103/06; C02F 2101/14;
(Continued)

(56) References Cited

U.S. PATENT DOCUMENTS 3,643,403　A　　2/1972　Speece
3,738,620　A　*　6/1973　Ennis ...................... B01F 25/21
　　　　　　　　　　　　　　　　　　261/6
(Continued)

FOREIGN PATENT DOCUMENTS

JP　　　　2008272632　A　　11/2008
KR　　　20210046491　A　　　4/2021
WO　　WO-2013132481　A1　*　9/2013　............. C02F 1/727

OTHER PUBLICATIONS https://skillingsandsons.squarespace.com/blog/how-a-submersible-well-pump-works-and-signs-of-failure (published Sep. 22, 2017; retrieved Sep. 14, 2025) (Year: 2017).*
(Continued)

*Primary Examiner* — Benjamin L Lebron
*Assistant Examiner* — Bernadette Karen McGann
(74) *Attorney, Agent, or Firm* — INNOVATION CAPITAL LAW GROUP, LLP; Vic Lin

(57)　　　　　　ABSTRACT
A cost-effective system and method dissolves gas, such as oxygen, into water in a manner that prevents gas bubble carry over by using a bubble capture system (BCS). The method further eliminates or minimizes turbulence at the suction and discharge of a pump using an energy dissipation header (EDH). The BCS can create a top-down flow that permits bubbles to rise faster than the velocity of the downward flow of water. The EDH can use a pipe design, such as a slotted pipe design, that permits a maximum system water flow. The technology can be applied to water bodies to mitigate eutrophication and may also be applicable in other fields, such as wastewater lift stations, fish farms, oil and gas industry, tidal applications with low flushing rates, and winter under ice oxygenation to prevent fish kills.

20 Claims, 15 Drawing Sheets

(58) Field of Classification Search
  CPC .... C02F 2209/22; B01F 23/23; B01F 23/231;
                      B01F 23/23105
  See application file for complete search history.

(56) References Cited

U.S. PATENT DOCUMENTS

| | | | | |
|---|---|---|---|---|
| 4,105,721 A | * | 8/1978 | Schliebe | ............... C02F 3/1294 |
| | | | | 138/44 |
| 4,931,225 A | | 6/1990 | Cheng | |
| 5,988,601 A | * | 11/1999 | Burgess | ............... A01K 63/042 |
| | | | | 261/93 |
| 7,491,324 B2 | | 2/2009 | Moulton | |
| 8,057,091 B2 | | 11/2011 | Tormaschy et al. | |
| 2003/0201554 A1 | * | 10/2003 | Speece | .................... C02F 3/226 |
| | | | | 261/123 |
| 2008/0112820 A1 | * | 5/2008 | Tormaschy | ........... B01F 33/503 |
| | | | | 405/52 |
| 2016/0250604 A1 | * | 9/2016 | Takahashi | ........... B01F 23/2323 |
| | | | | 261/21 |
| 2017/0341037 A1 | | 11/2017 | Matsumoto et al. | |
| 2022/0306500 A1 | | 9/2022 | Gantzer | |

OTHER PUBLICATIONS https://www.deltafluid.fr/files/Produits/Documents/multi-hole-orifice-plate-rev.1-feb-2016.pdf (published Feb. 2016; retrieved Sep. 15, 2025) (Year: 2016).*
International Search Report & Written Opinion dated Jan. 22, 2024 from PCT Application No. PCT/US2023/032349, 12 pages.

* cited by examiner

METHOD AND SYSTEMS FOR OXYGENATION OF WATER BODIES

BACKGROUND OF THE INVENTION

1. Field of the Invention

Embodiments of the invention relate generally to water quality improvement. More particularly, embodiments of the invention relate to a systems and methods for improving water quality via oxygenation without creating turbulence in the water column of the water body while preventing or minimizing sediment resuspension.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Eutrophication from urbanization has been observed as a growing problem in water bodies around the world. A major indicator of the growing eutrophication problem is oxygen demand in the hypolimnion more than available dissolved oxygen (DO) in bottom waters at the onset of stratification, leading to hypolimnetic hypoxia and, in severe cases, anoxia. Anoxia in bottom waters can result in the release of iron bound phosphorus from the sediments, often identified as internal phosphorus loading. In the event phosphorus rich bottom waters mix to the surface, this can create an algal bloom, thus exacerbating eutrophication. One method to control the internal phosphorus loading because of anoxia is to add oxygen to maintain oxidized conditions over the sediments, provided there is sufficient iron binding capacity and there is not excessive organic matter.

There are several methods employed to combat hypolimnetic anoxia, including the use of pure oxygen through hypolimnetic oxygenation systems. Although there are several water quality management strategies that are designed to add oxygen to the water column, there are only three main types of systems: an air-lift aerator, direct gas sparging, and saturation technologies.

Air-lift aerators consist of a simple structure where air is introduced at the bottom of a pipe-like structure, positioned in the water column near the bottom. As the air-water mixture rises, oxygen from the air bubble dissolves into the water. At the top of the structure any remaining bubbles are vented to the atmosphere while the oxygenated water returns to a pre-determined depth through a separate structure often identified as a downcomer. Oxygen transfer efficiencies are low and typically range between 20 and 25 percent.

Direct gas sparging (diffuser) systems use a weighted supply pipe to carry the gas to an engineered structure, located on or near the bottom, to release small bubbles directly to the water column. Diffuser systems can use compressed air or pure oxygen gas. Compressed air systems are generally used to de-stratify the water column. Pure oxygen systems are used to increase oxygen levels in the bottom waters while preserving thermal stratification. Diffuser systems, in general, are more efficient when deployed in deeper waters.

Saturation technologies, often referred to as side-stream saturation (SSS) involve removing water from a waterbody via a pump, injecting gas, and then discharging the gas enriched water back to the water column. Saturation systems to manage anoxia, typically use pure oxygen and can achieve oxygen transfer efficiencies greater than 90%. Saturation systems are most effective in shallower applications. The discharge header for SSS is typically designed using a large pipe with evenly spaced holes and positioned a fixed distance above the bottom. This was first developed in the 1990s following flume tests to determine sediment resuspension velocities. Two velocities were identified, one at which surficial material was removed and a slightly higher rate at which the underlying material, which was identified to constitute an identifiable sediment layer, was not removed.

FIG. 1 illustrates a conventional side-stream saturation system where water is taken up from the water body with an intake header 100, pumped through piping 102 to a pump 104. The flow can be introduced to an oxygen contact chamber 106, where oxygen can be supplied via an oxygen supply 108. The oxygenated water can be re-introduced, via piping 110 to the water body via the distribution header 112.

Subsequent designs incorporated the higher velocities for discharge header design. Using a maximum bed velocity formula, the position of the discharge header above the bottom can be determined. Even though operation of these types of discharge headers do not disrupt the identifiable sediment layer, they still have the potential to disrupt the surficial material.

Operation of each of these systems promotes turbulence in the water column. Turbulence induced by operation all three of these systems can exacerbate oxygen demands. Turbulence was also observed to result in phosphorus release from resuspension of sediments. Therefore, it has been observed that operation of these systems can exacerbate the exact conditions that the oxygenation strategies are trying to prevent.

Water quality management strategies were reviewed, and it was identified that oxygenation systems were the most effective and produced the most consistent results regarding water quality improvement. For shallow applications, this eliminates air-lift aerators and diffuser systems. To date, there is not a small scale affordable SSS system on the market for shallow water bodies. Additionally, there is not an oxygenation system on the market that is designed to prevent turbulence in the water column and minimize or prevent sediment resuspension.

SUMMARY OF THE INVENTION

Embodiments of the present invention provide a water treatment system for treating a body of water comprising an intake header having a plurality of openings permitting a predetermined maximum flow therethrough; a discharge header having a plurality of openings permitting an outflow predetermined maximum flow therethrough; a pump drawing water from a water body through the intake header; an oxygen contact chamber operable to oxygenate water flowing therethrough, the pump delivering water into the oxygen contact chamber; and a bubble capture system (BCS) receiving water from the oxygen contact chamber at an upper end thereof inside a housing, outflow being release from the BCS at a lower end of the housing, wherein the pump, the oxygen contact chamber and the BCS are disposed in the body of water.

Embodiments of the present invention further provide a water treatment system comprising an intake header and a discharge header, each having a plurality of openings permitting a predetermined maximum flow therethrough; a discharge header having a plurality of openings permitting an outflow predetermined maximum flow therethrough; a pump drawing water from a water body through the intake header; an oxygen contact chamber operable to oxygenate water flowing therethrough, the pump delivering water into the oxygen contact chamber; and a bubble capture system (BCS) receiving water from the oxygen contact chamber at an upper end thereof inside a housing, outflow released from the BCS at a lower end of the housing and passed through the discharge header back to the water body, wherein the predetermined maximum flow is either equal to or less than about 0.1 feet per second or the predetermined maximum flow results in a flow with a Reynolds number less than 50; and the pump, the oxygen contact chamber and the BCS are disposed in the body of water at a water level where the intake header and the discharger header are located.

Embodiments of the present invention also provide a method for oxygenating a water body without creating turbulence in the water column while minimizing sediment resuspension at a floor of the water body comprising disposing the water treatment device of claim 1 in the water body; permitting a predetermined maximum flow through a plurality of openings of the intake header; drawing water from the water body via a pump through the intake header; oxygenating water flowing through the oxygen contact chamber, the pump delivering water into the oxygen contact chamber; receiving water from the oxygen contact chamber at an upper end of the bubble capture system (BCS) inside a housing thereof, an outflow being released from the BCS at a lower end of the housing; delivering the outflow into the water body at a treatment level where the pump, the oxygen contact chamber and the BCS are located.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

4

Figure 7A:
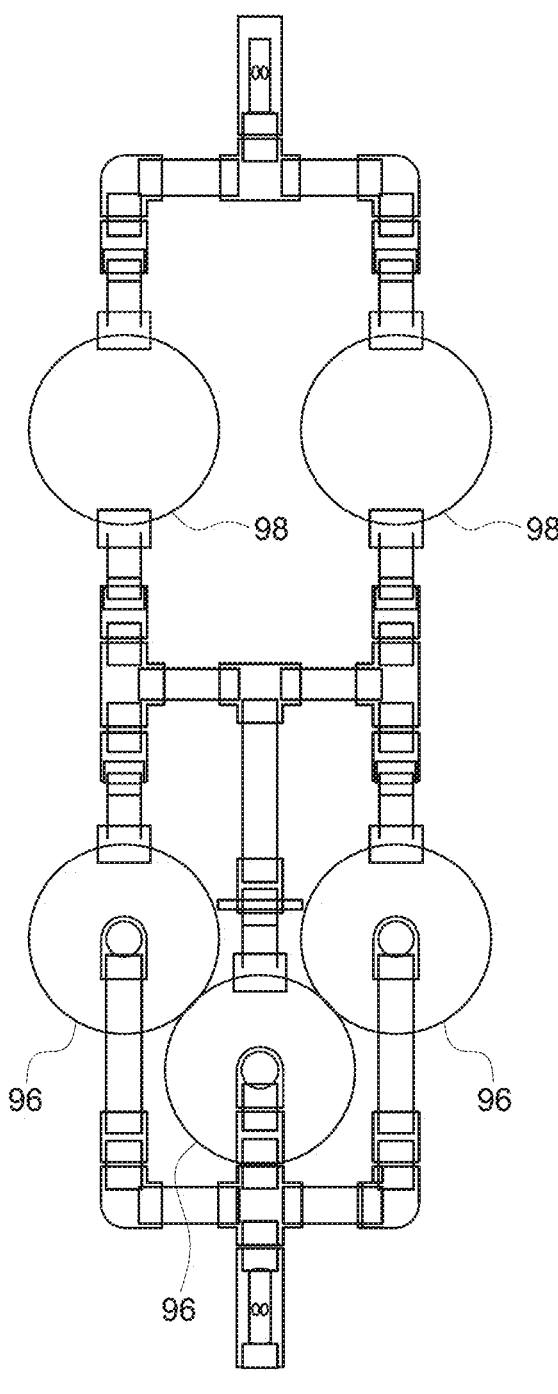
Figure 7B:
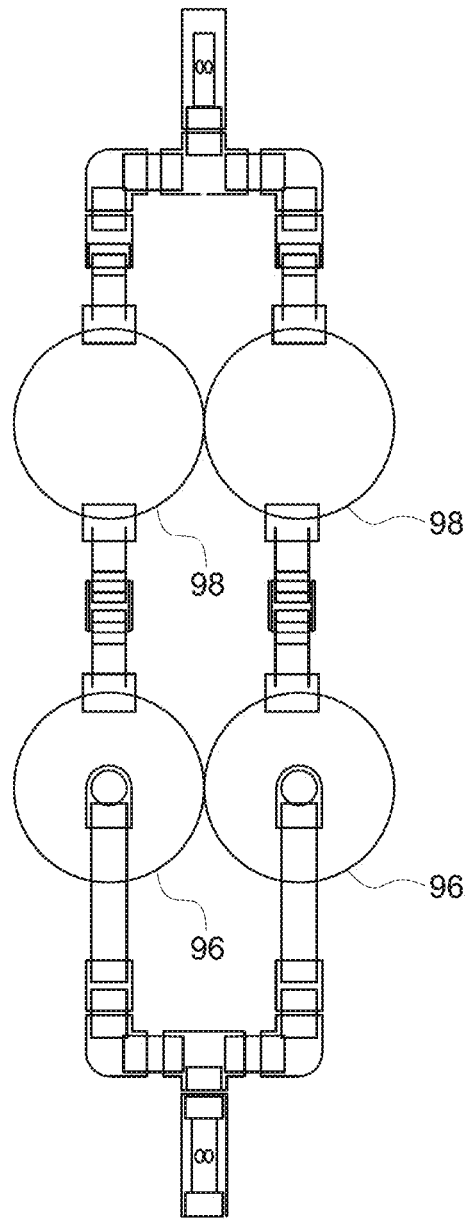
Figure 8:
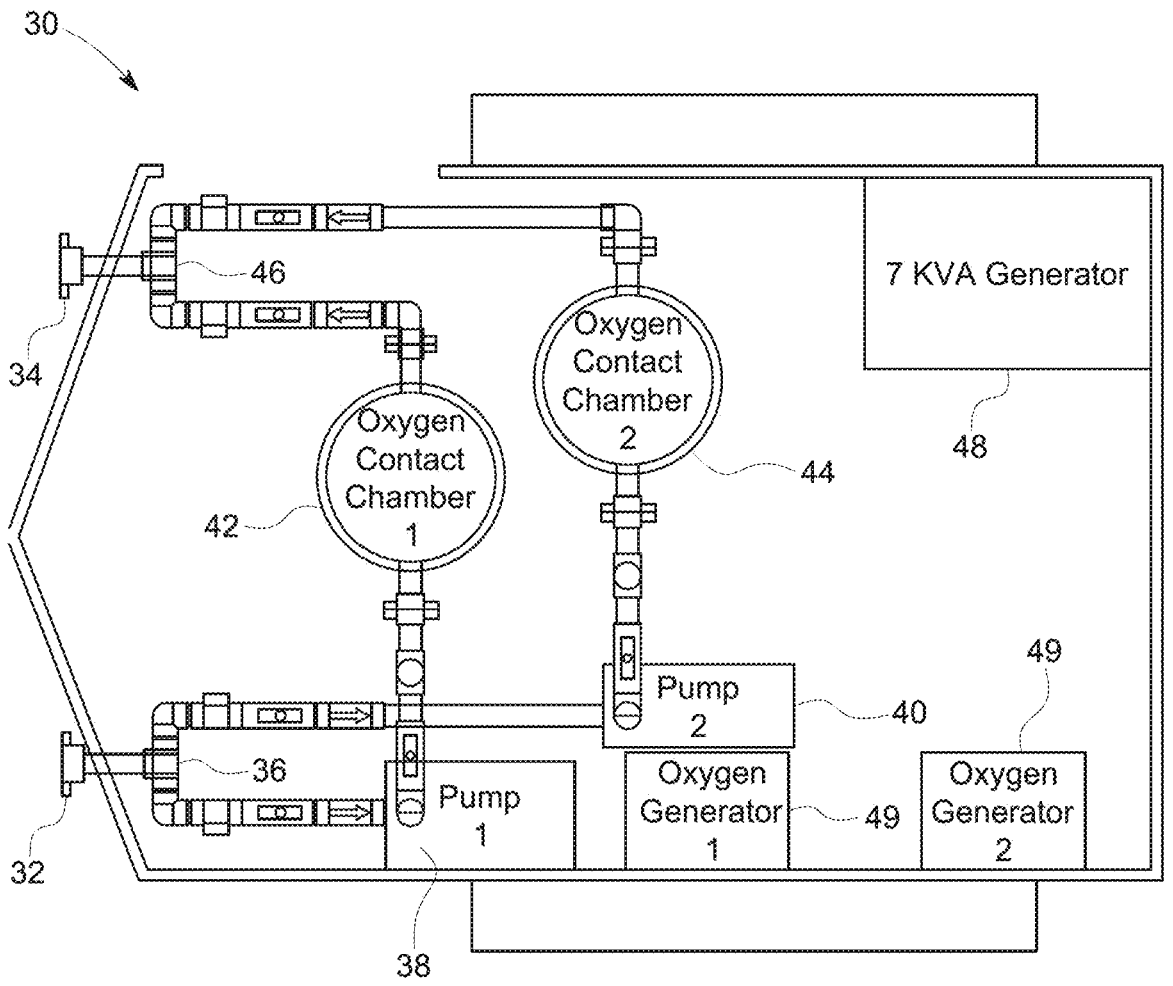
Figure 9:
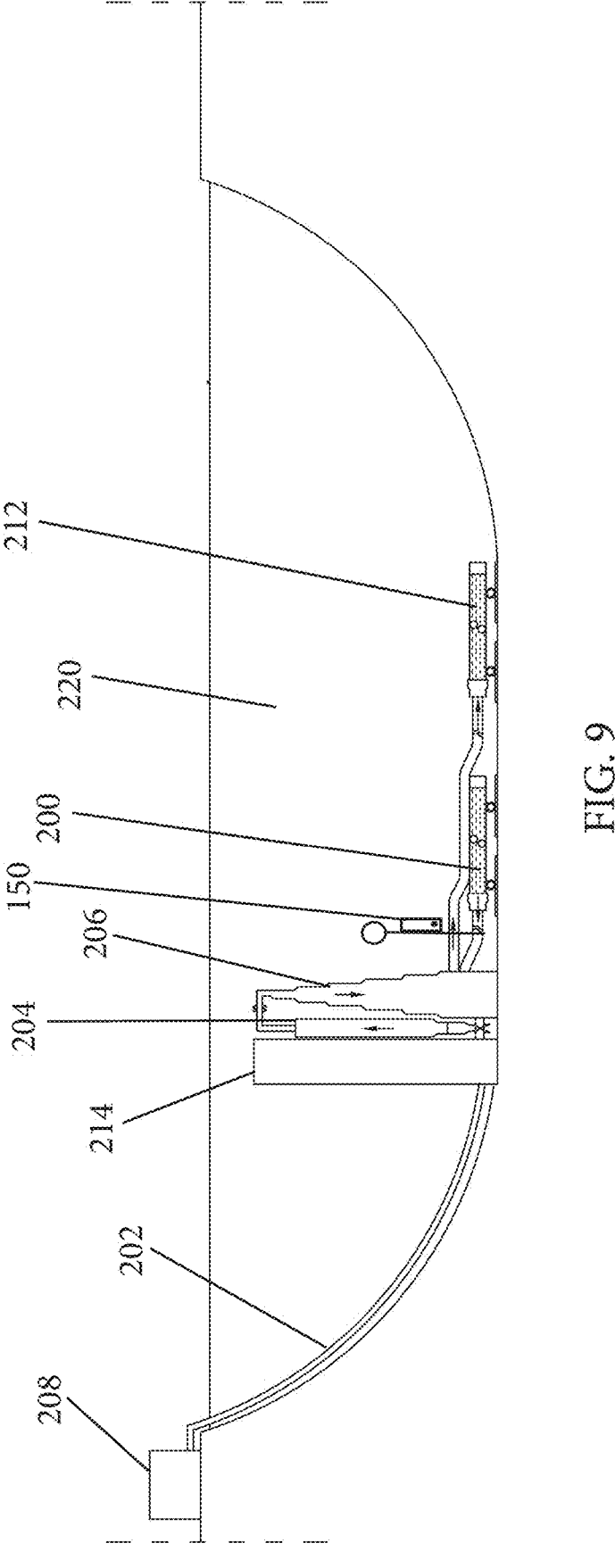
Figure 10:
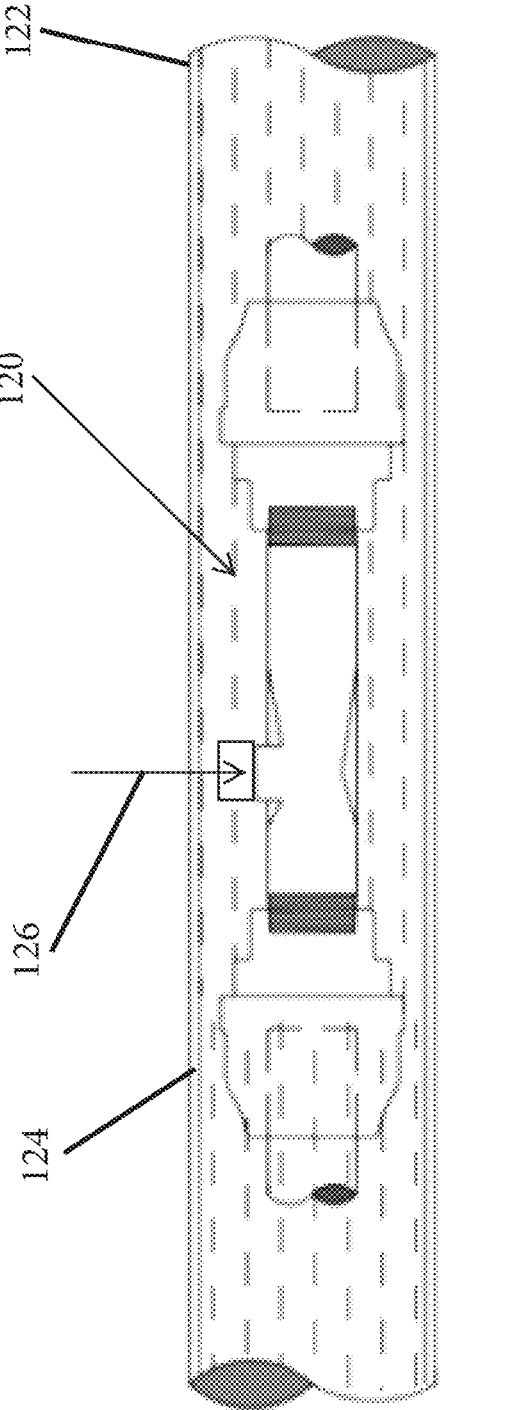
Figures 11, 12:
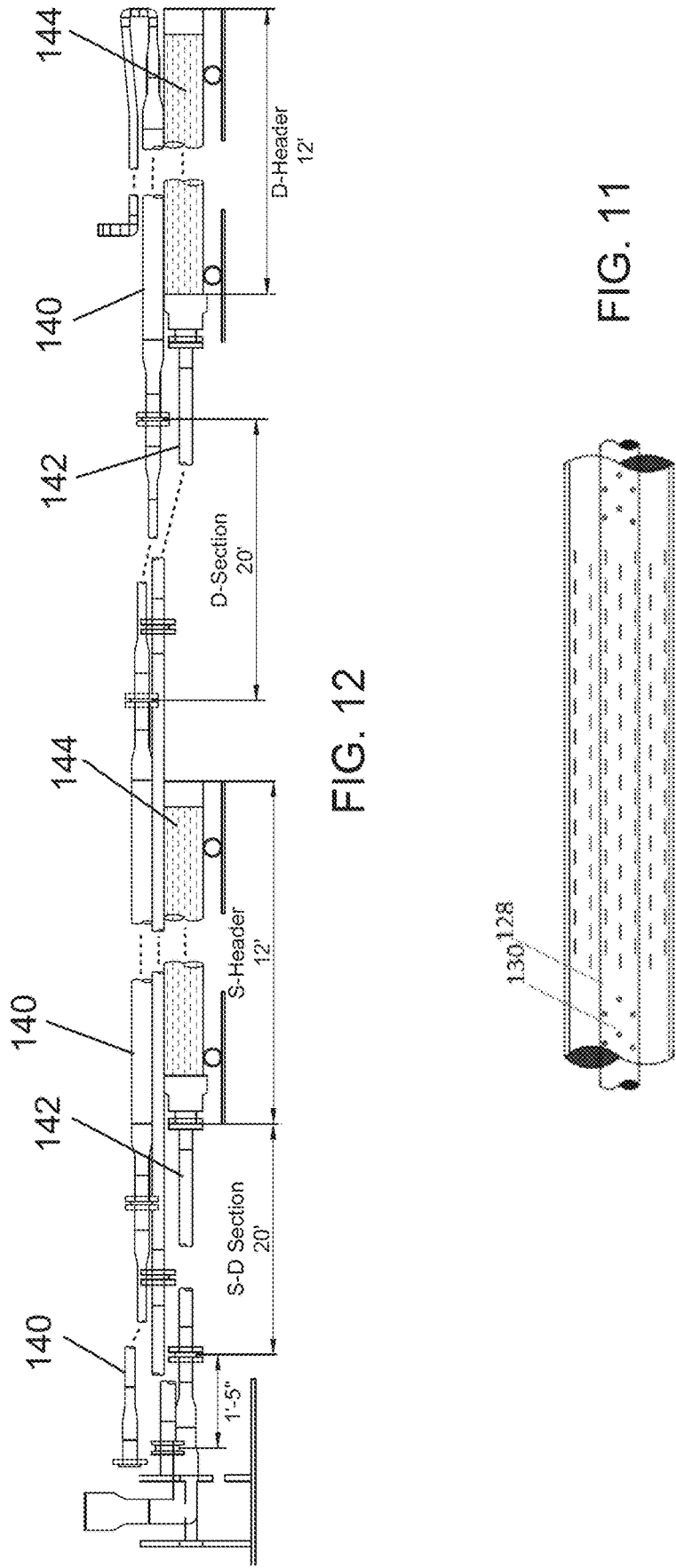
Figure 13:
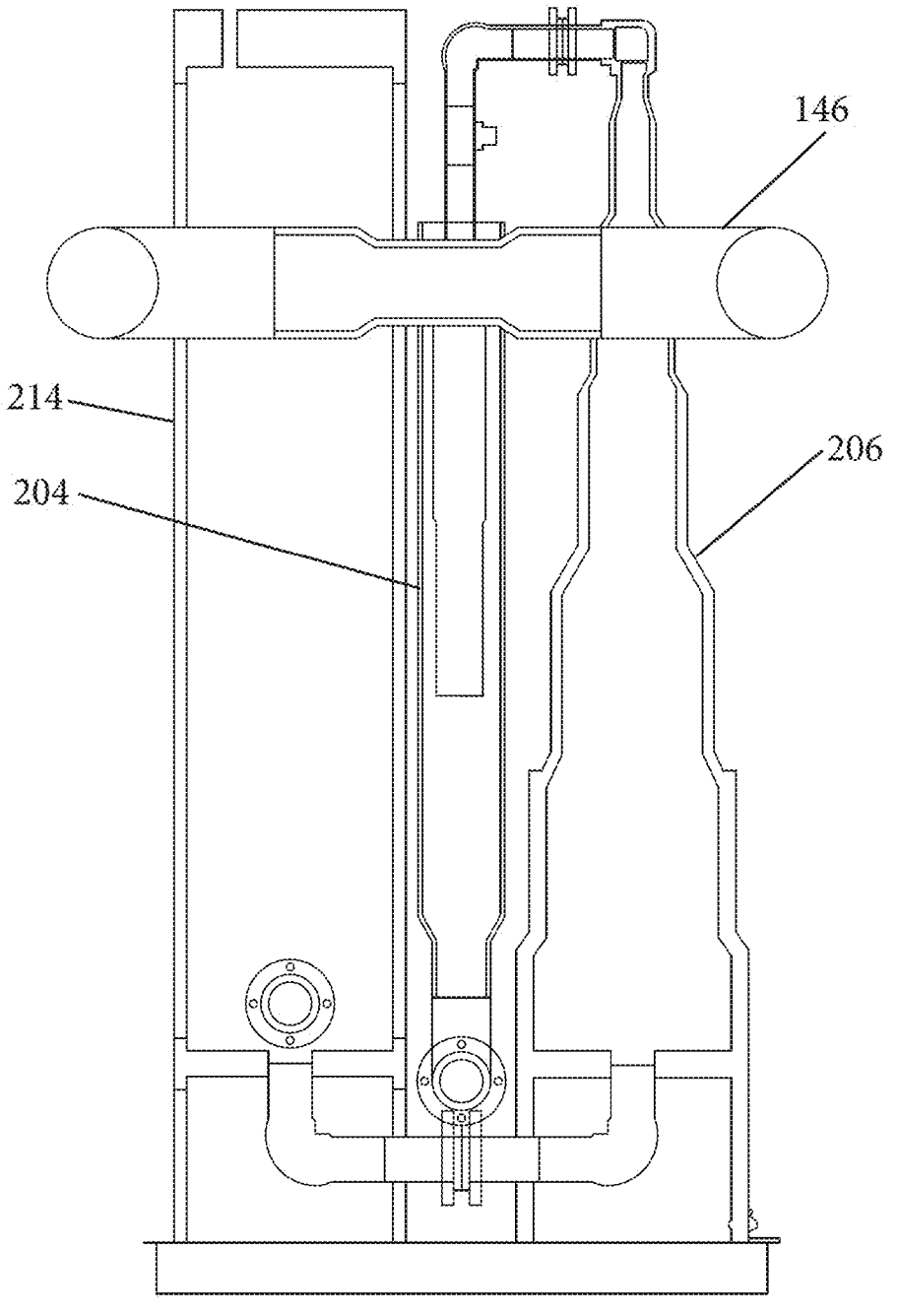
Figure 14:
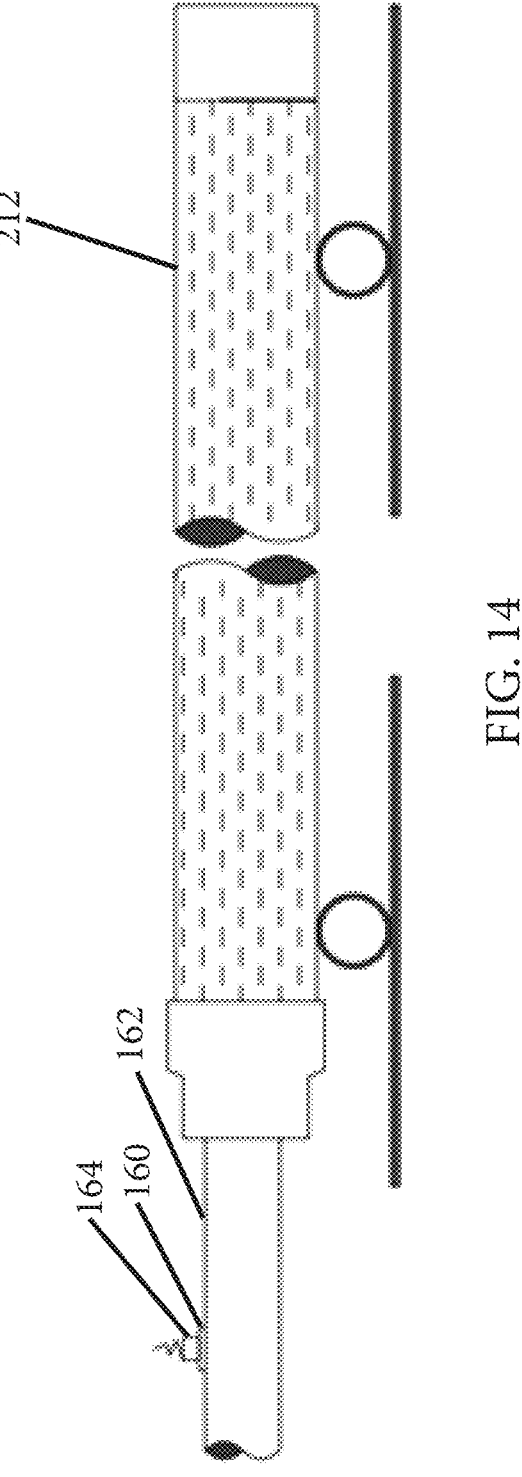
Figure 15:
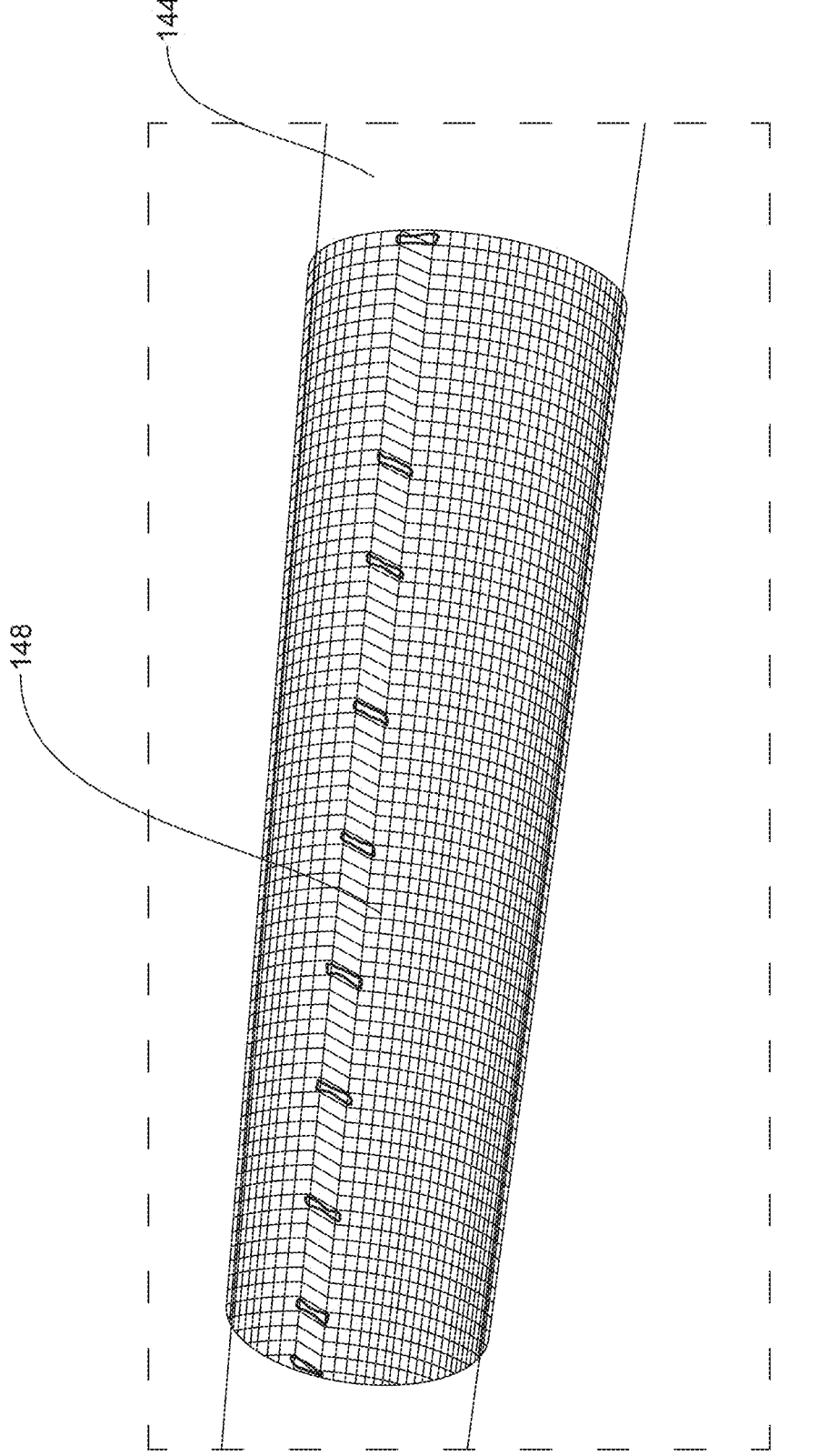

FIGS. 7A and 7B illustrate various configurations usable for the water body treatment system according to exemplary embodiments of the present invention;

FIG. 8 illustrates a system with two treatment flow paths according to an exemplary embodiment of the present invention;

FIG. 9 illustrates a cross-sectional view of a body of water having a water treatment system disposed therein, according to an exemplary embodiment of the present invention;

FIG. 10 illustrates a venturi-type device usable to draw water into a discharge pipe of a water treatment device according to an exemplary embodiment of the present invention;

FIG. 11 illustrates an end view of an orifice pipe having a plurality of orifices disposed therethrough, according to an exemplary embodiment of the present invention;

FIG. 12 illustrates a side view of piping, headers and buoyancy devices usable in a water treatment device according to an exemplary embodiment of the present invention;

FIG. 13 illustrates a cross-sectional view of an oxygen contact chamber, a pump and a bubble coalescing system having a buoyancy ring disposed thereabout, according to an exemplary embodiment of the present invention;

FIG. 14 illustrates a side view of a discharge pipe having a valve and upwardly facing nozzle, usable in the water treatment device according to an exemplary embodiment of the present invention; and FIG. 15 illustrates a side view of a header having a copper mesh applied thereto according to an exemplary embodiment of the present invention.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature (s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a cost-effective system and method to dissolve gas, such as oxygen, into water that prevents gas bubble carry over, by using a bubble capture system (BCS). The system further eliminates or minimizes turbulence at the suction and discharge of a pump using an energy dissipation header (EDH). The BCS can create a top-down flow that permits bubbles to rise faster than the velocity of the downward flow of water. The EDH can use a pipe design, such as a slotted pipe design, that permits a maximum system water flow. The technology can be applied to water bodies to mitigate eutrophication and may also be applicable in other fields, such as wastewater lift stations, fish farms, oil and gas industry, tidal applications with low flushing rates, and winter under ice oxygenation to prevent fish kills.

One premise of exemplary processes according to aspects of the present invention is that gas bubble carryover from the oxygen dissolution process is minimized or eliminated through the gas coalescing chamber. Further, effervescent degassing can be eliminated by designing the oxygenation process to not exceed saturated concentrations of oxygenated water at depth. Preventing any gases from being released from the distribution header prevents undesirable turbulence in the water column and preserves thermal stratification and/or eliminates disturbance to ice for winter under ice applications.

Secondly, exemplary processes according to aspects of the present invention eliminate the turbulence in the water column from the energy imparted to the water as it is pumped through the system. There are several reasons to promote low energy related to water velocity and pumping. If the system can minimize turbulence, the system can minimize the induced oxygen demands because of system operation. Here, the term "induced oxygen demands" is used to mean or to represent increase oxygen demands. By minimizing induced oxygen demand, systems do not need to be oversized to make up for this increased demand from system operation, which, in turn, keeps both capital costs and operating costs lower. Another benefit from decreasing the velocity of water through the suction and discharge headers is to prevent the re-suspension of sediments. Re-suspension of sediments can result in the release of nutrients to the water column, such as phosphorus, and in an increase in oxygen demands.

The amount of gas that can be dissolved into solution is driven by Henry's law. Henry's law states that the dissolved concentration of a gas in solution is relative to the partial pressure of that gas. Based on Henry's law the saturation concentration of a gas in solution can be determined for a known pressure and temperature. Therefore, using Henry's law to identify the saturation concentration of a gas dissolved in solution, the theoretical maximum amount of gas that can be dissolved into a solution can be calculated based on the water flow rate in the corresponding gas flow rate. Applying a gas more than can be dissolved relative to saturation conditions or if the same amount of gas were added and saturation conditions changed, for example if water temperature increased, there would be a buildup of excess gas resulting in bubble carryover of that gas.

The approach taken of dissolving gases into water and then discharging it back to the water column, according to aspects of the present invention, incorporates a two-fold approach to prevent bubble release at the distribution header. Prevention of effervescent degassing is achieved by ensuring that the SSS systems are engineered not to exceed saturation conditions relative to pressure and temperature at depth. Gas bubble carryover is prevented by allowing a gas bubble, either nitrogen stripping process or overfeeding of oxygen, to buildup and then be released in an engineered chamber—the bubble capture system (BCS), discussed below.

There are no known conventional methods that address reduction of induced turbulence in the water column from operation of any water quality management strategy. Extensive research has been conducted to look at water column circulation from bubble plume applications related to diffuser operation, and firsthand experience has identified the problems and challenges associated with the discharge headers, nozzles, and energy dissipation from operating SSS systems and corresponding sediment scouring and resuspension.

The well screen industry uses an engineered structure, such as slotted well screen, to ensure water velocities do not exceed a given threshold. This is done to prevent the entrainment of sediment particles into a pump inlet from a wellbore. To address sediment scouring and resuspension, aspects of the present invention can use a flow inhibiter, such as a slotted well screen, in an open water condition. The benefit of using a slotted well screen as the suction and discharge header provides several advantages for SSS technology applications. The velocities over the well screen are low enough to prevent the resuspension of surficial sediments. Because the velocities are so low across the inlet or outlet structure, they can be laid directly on the bottom, thus promoting oxygen injection directly over the settlements where it is needed most.

As discussed in greater detail below, aspects of the present invention can provide several unique advantages over conventional technologies. For example, the water treatment system of the present invention can combine two different oxygen saturation technologies to manage the nitrogen buildup and corresponding bubble carryover. The water treatment system can further prevent the induction of any turbulence to the water column or resuspension of sediments. The water treatment system can passively eliminate clogging of intake structures by providing interchangeable suction and discharge headers for its pumping system. The water treatment system can be used in various applications, such as water treatment, under ice treatment, and the like, and by various organizations, including municipalities, homeowners' associations and golf course owners, due to its affordability.

Figure 1:
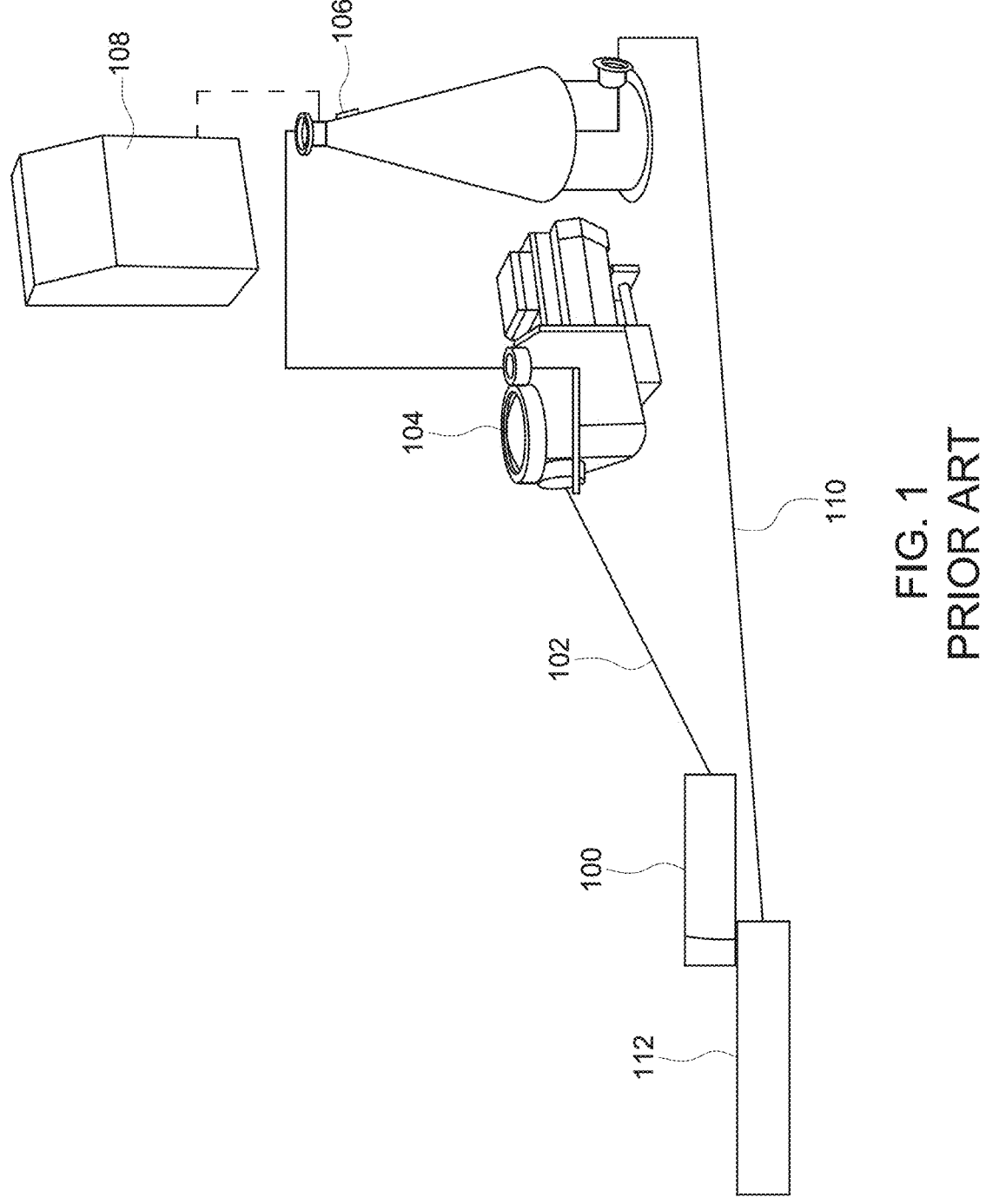
FIG. 1 illustrates a conventional side-stream saturation system for water oxygenation.
Figure 2A:
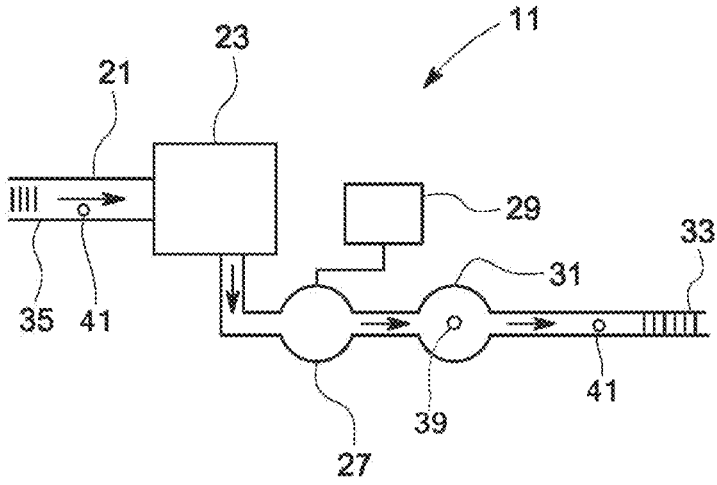
FIG. 2A illustrates a schematic representation of a water body treatment system according to an exemplary embodiment of the present invention.

Referring to FIG. 2A, a water treatment system 11 can include an intake 35 that can be placed into a water body (not shown). Flow through tubing 21 can be powered by a pump 23. An oxygen contact chamber 27, including an oxygen source 29, can oxygenate the flow. A bubble capture system (BCS) 31 can help ensure gas bubbles are not present in the outflow delivered back to the water body via a distribution header 33 (also referred to as discharge header 33). As described in greater detail below, while the oxygenation device 27 and the BCS 31 are shown as two distinct structures, in some embodiments, these devices can be combined into a single structure (with a single structure footprint), where oxygenation is performed followed by bubble capture.

Referring also to FIG. 2A, the intake and discharge headers 35, 33 can be formed in a manner that limits flow therethrough. For example, slots 37 can be cut into the headers 35, 33. The slotted headers 35, 33 can be designed to ensure the velocity of the water entering or exiting the header is equal to or less than about 0.3 feet per second, typically equal to or less than about 0.1 feet per second, and/or maintains a Reynolds number less than 50. The intake and discharge headers 35, 33 are designed to lay directly on the bottom/sediments of a water body and are interchangeable. Thus, should the intake header 35 get clogged, the discharge header 33 can be moved to the intake and the intake header 33 can be moved to the discharge, resulting in clearing the clog (due to the outflow) and creating a clear inflow. The headers 35, 33 can further ensure that sediment particles are not entrained by the pump, nor are they disturbed by discharging water from the pump.

The pump 23 is a mechanism to withdraw water from a water body, increase the pressure as it moves through the oxygen contact chamber 27 and then return the water to the waterbody at the same depth that was withdrawn. The oxygen source 29 can be an on-site pressure swing adsorption (PSA) oxygen generator, for example. A venturi injector is a device that allows gas at lower pressures than pump operation to be drawn into the water stream upstream of the conical shaped oxygen contact chamber 27, as is known in the art. The conical shaped oxygen contact chamber 27 can resemble conventional devices, such as that in U.S. Pat. No. 3,643,403, herein incorporated by reference, by incorporating increasing diameters from water input to output. The conical shaped oxygen contact chamber 27 can be manufactured out of high-density polyethylene (HDPE) pipe using basic fusion equipment.

The BCS 31 can receive water entering a pressurized vessel and traveling through a riser pipe to a height just below the top of the vessel, where the bubble water mixture is discharged. The water then flows downward towards an outflow located near the bottom of the vessel. The vessel diameter is large enough to ensure that the downward water velocity is slower than bubble rise velocity so the bubbles will remain near the top of the vessel. This, in turn, promotes the bubbles that did not dissolve into the water to coalesce at the top of the chamber where they can be vented to the atmosphere using an air release valve (ARV) 39. The air release valve 39 can be positioned near the top of the BCS 31 to allow air to be released manually from the chamber during initial fields. A manometer (not shown) can be used to determine a water level in the BCS 31 so that gas may be vented from the BCS 31 via the air release valve 39 at the appropriate time, prior to the amount of gas growing too large to affect the operation of the BCS 31.

Pressure gauges (not shown) can be used on the outlet of the pump 23 and the outlet of BCS 31 to monitor pressures to ensure that the system is operating properly. A water flowmeter (not shown) can be used to ensure the design flow rate meets the design criteria of the system.

Sampling ports 41 can be located on the suction before the pump 23 and after the contact with the BCS 31 to monitor inflowing and outflowing oxygen concentration. The outflow can use a high range dissolved oxygen (DO) probe capable of measuring up to 100% oxygen concentrations in solution.

Figure 2B:
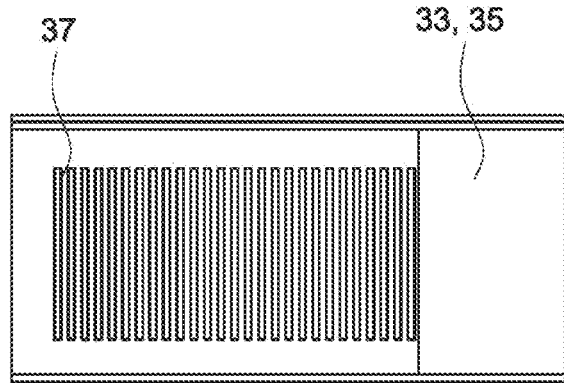
FIG. 2B illustrates a detailed view of an exemplary intake and/or distribution header usable with the water treatment system.
Figure 3A:
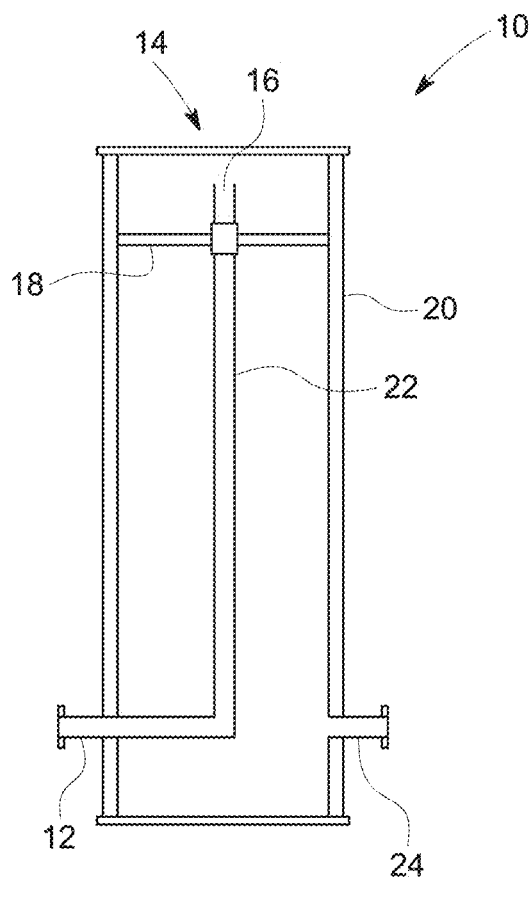
FIG. 3A illustrates a schematic representation of a bubble coalescing system (BCS) usable in the system of the present invention.
Figure 3B:
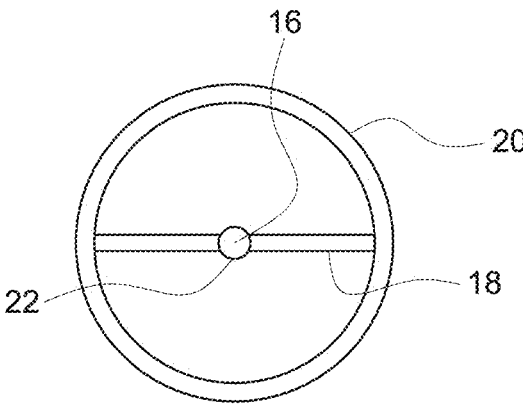
FIG. 3B illustrates a detailed view of a bubble coalescing system (BCS) usable in the system of the present invention.

Referring to FIGS. 3A and 3B, an exemplary bubble capture system (BCS) 10 is shown. BCS 10 may be utilized as the BCS 31 in FIG. 2, for example. The BCS 10 can include an inlet 12 and a riser 22 with an open end 16 a distance from a top 14 of the housing 20. A bracket 18 can hold the riser 22 in a central position, as best seen in FIG. 3B. An outlet 24 is provided at a lower end of the housing 20. Flow of fluid through the BCS 10, as discussed above, can be designed so that any bubbles in the inflow are not pulled downward within the housing 20 as part of the outflow. Thus, the outflow can be free from air bubbles.

System design went through a series of iterations before coming up with the final contact chamber size and configuration. Such configurations, all of which may be usable in the apparatus and methods of the present invention, are shown below in FIGS. 4 through 6.

In summary the first contact chamber included a pipe discharging water for the top of a large cylindrical chamber that was 24 inches in diameter and 68 inches tall. The idea was that the large contact chamber provided a large headspace and adequate retention time to dissolve oxygen into the water. It was found that this chamber was capable of dissolving about 40% of the oxygen applied.

After identifying that most of the water was out of contact with the oxygen headspace, it was determined that the contact chamber needed to be reduced in size to be more effective. The resulting contact chamber was a combination of a Speece Cone type contact chamber using HDPE reducers to simulate the conical shape of a Speece Cone and a second chamber that was 12 inches in diameter that had a pipe discharging inside near the surface, like the larger one but just smaller in diameter. Several configurations were tested to determine the best combination to dissolve oxygen in water as efficiently as possible and to promote a bubble to coalesce at the top of the second chamber. Field test revealed that when flow rates were too high gas was carried through both chambers and bubbles were visible in the clear discharge piping. Additionally, it was observed that when the bubble head space grew too large, there was not enough water volume for bubbles in the system to remain in the headspace and were thus observed to be carried through. A second iteration of the BCS was to reduce its size; however, it was observed that the shorter version did not allow enough time for the bubbles to rise back to the surface of the chamber.

A further version (see FIG. 6) of the paired contact chambers identified a maximum flow rate of approximately 30 gallons per minute through each pair of chambers, with the conical chamber followed by a bubble coalescing system chamber.

Each of these systems are described below with respect to FIGS. 4 through 6.

Figure 4:
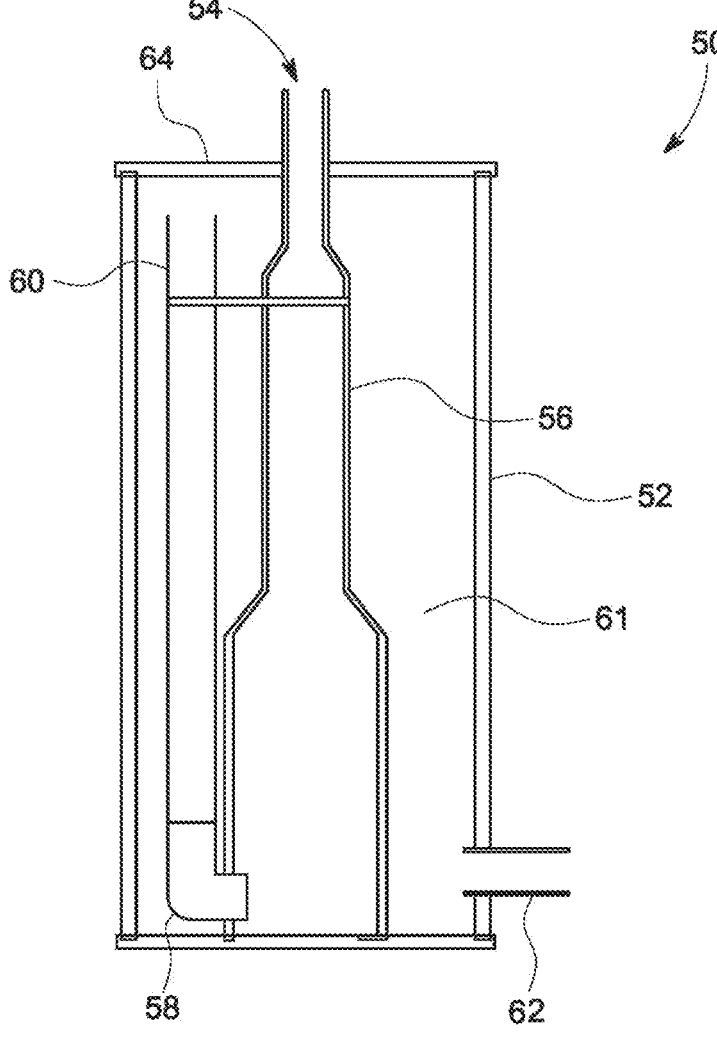
FIG. 4 illustrates a combined BCS and oxygenation cone according to an exemplary embodiment of the present invention.

Referring to FIG. 4, in some embodiments, a system 50 can provide the BCS and the oxygen contact chamber in the same external housing 52. Flow can be introduced into the top 54 of the oxygen contact chamber 56. Outflow from the oxygen contact chamber 56 can pass through riser 58 and flow out at a top 60 of the riser 58. The flow can move downward through the interior 61 of the external housing 52 to outlet 62. Like the BCS 10 described above, flow can be designed so that any bubbles in the outflow from the oxygen contact chamber 56 are not pulled downward within the housing 52 as part of the outflow at the outlet 62. Thus, the outflow can be free from air bubbles.

Figure 5:
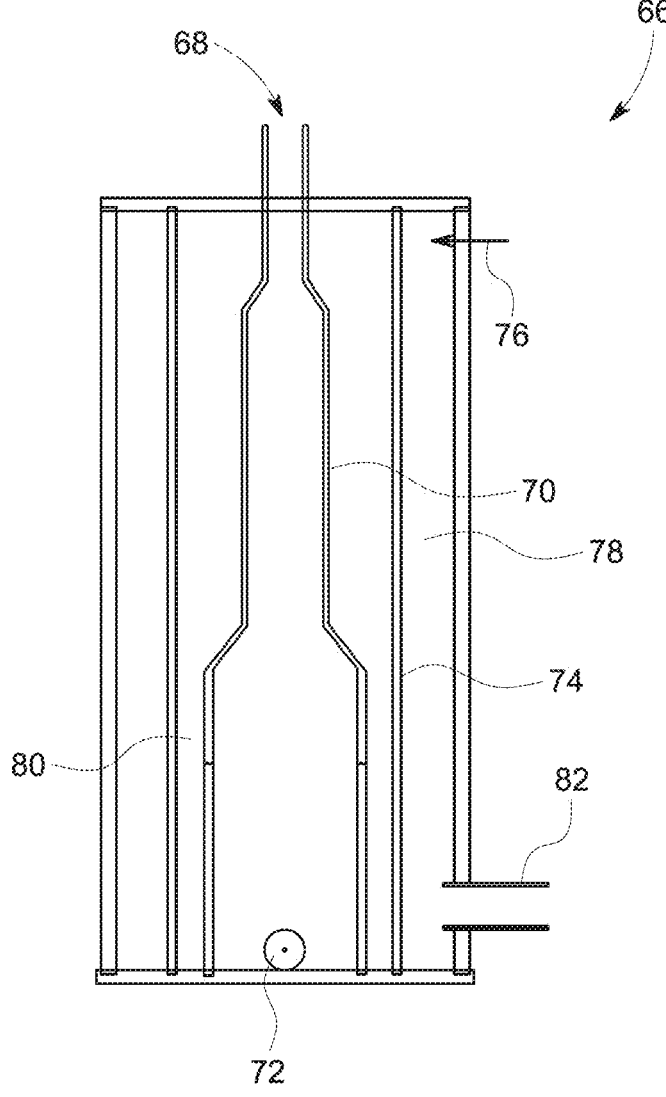
FIG. 5 illustrates a combined BCS and oxygenation cone according to an exemplary embodiment of the present invention.

Referring now to FIG. 5, in another embodiment, a system 66 can provide the BCS and the oxygen contact chamber in the same external housing. The inflow 68 can enter in the top of the oxygen contact chamber 70. The outflow from the oxygen contact chamber 70 can be at port 72 at the base thereof. The oxygen contact chamber 70 can be housed in an internal housing 74, where fluid 80 from the port 72 can flow upward and exit at holes (indicated as being at a height at arrow 76) formed in the internal housing 74. The fluid 76 can pass downward inside the external housing to flow out the outflow port 82. Like the systems described above, flow can be designed so that any bubbles in the outflow from the oxygen contact chamber 70 are not pulled downward within the flow of fluid 76 as part of the outflow at the outlet 82. Thus, the outflow can be free from air bubbles.

Figure 6:
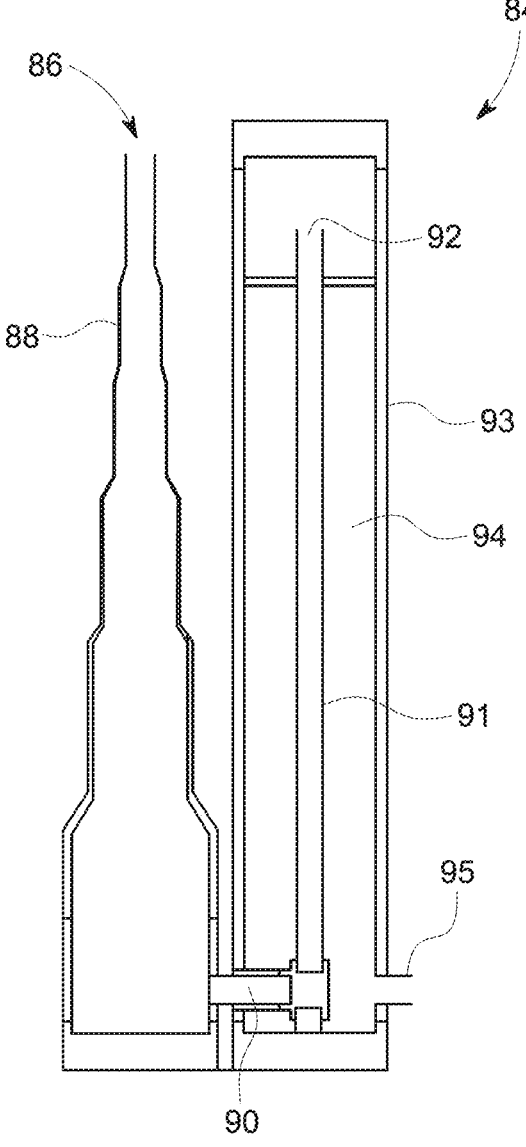
FIG. 6 illustrates a BCS and oxygenation cone disposed side-by-side according to an exemplary embodiment of the present invention.

Referring to FIG. 6, the oxygen contact chamber 88 and the BCS 84 can be disposed side-by-side, where inflow 86 into the oxygen contact chamber 88 can enter the BCS via inlet 90 and be directed through riser 91 to exit at the top 92 of the riser 91. The fluid can flow downward on an interior 94 of the housing 93 to exit out of the outlet port 95. Like the systems described above, flow can be designed so that any bubbles in the outflow from the oxygen contact chamber 88 are not pulled downward within the housing 93 as part of the outflow at the outlet 95. Thus, the outflow can be free from air bubbles.

Regardless of the type of system used, including the various designs described above with respect to FIGS. 4 through 6, the system can be modular in that various numbers of oxygen contact chambers and BCS's can be used with various flow patterns. For example, as shown in FIG. 7A, inflow can be split into three paths for oxygenation by three different oxygen contact chambers 96. This outflow from the oxygen contact chambers 96 can be combined into two paths for treatment by two different BCS 98 before exiting as a single outflow. Another option is shown in FIG. 7B, where two oxygen contact chambers 96 feed two BCS 98.

FIG. 8 illustrates a possible arrangement of parts on a trailer 30 for the configuration shown in FIG. 7B, where an inflow 32 splits at tee 36 into two flows, each driven by respective pumps 38, 40, each flow passing through respective oxygen contact chambers 42, 44, which can include an integrated BCS (not shown) or a side-by-side BCS arrangement, as shown above. The outflows can be combined at tee 46 to exit at outflow 34. A generator 48 can provide power for the pumps 38, 40 and the oxygen generators 49. Of course, other configurations may be used within the scope of the present invention.

Initial testing of the system was conducted to determine the best configuration of the two types of chambers to achieve both maximum oxygen dissolution and gas bubble management.

Part of the testing was conducted to identify maximum and minimum water flow rates that could be applied to the sized chambers that were used. Again, the premise was to keep things affordable and, more importantly, to be modular. Initial studies showed that flow rates too low did not provide sufficient oxygen exchange as was the case in the original large contact chamber and flow rates too high promoted excessive bubble carryover, even though the engineered system to capture and promote bubble coalescing.

At the lower pressures that were used, approximately 25 to 30 PSI, 90% oxygen transfer efficiency was obtained. Oxygen addition rates were monitored using a high range Hamilton DO probe and compared to theoretical oxygen concentrations based on water flow and oxygen gas flow rates.

An initial series of tests were conducted at low pressures, approximately 10 PSI, in which a higher concentration of nitrogen was stripped from solution. During these lower pressure tests, a larger gas bubble was observed to form and build up in the BCS. The concentration of the gas bubble was tested using an atmospheric DO probe and confirmed the percentage of oxygen in the headspace compared to theoretical oxygen concentration based on the partial pressures of nitrogen and oxygen in the system. As operation was continued, this low pressure the gas bubble was observed to build up and, as the gas bubble got large enough, the volume of water in the BCS was too low to prevent carryover and bubbles were observed in the discharge piping through the clear PVC piping provided for such observations.

The clear PVC on the discharge of the system was also used to monitor water clarity to detect if any sediment material was being entrained by the inlet structure. A small amount of turbidity was observed during initial startup after the suction pipe suction header was first installed in the Lake. After operation of approximately 10 minutes, the water clarity in the pipe cleared up and remained clear for the duration of testing, for this instance, approximate two weeks.

To test the impact of possible turbulence induced by system operation, the suction and discharge headers were installed in one part of a deep basin that was separated by a shallower shelf to and adjoining deep basin. Keeping in mind that oxygen disperses very rapidly or more easily through water of constant temperature slight increases in temperature, even as little as 0.1 Celsius degree, have been observed to prohibit dispersion of oxygen from one density layer to another, which is the case for operation of conventional systems as a result of mixing water in the hypolimnion with the bottom of the thermocline resulting in increased rates of warming. If operation of the system of the present invention caused any localized warming, in the vicinity of the system discharge, oxygen addition would be observed to be localized in that region. If the system did not cause any mixing and corresponding warming in the vicinity of the discharge, oxygen would be observed to disperse, or spread uniformly across the basin relative to the temperature where the oxygenated water was being discharged.

Initial water column profiles identified that the temperature throughout the lower waters was uniform throughout the entire deeper part of the water column, in both basins. After just a couple of days of operation, oxygen concentrations were observed to increase in both the oxygenated region and in the control region. Over the course of a week of operation, oxygen levels in the control basin were observed to be approximately 1 mg/L lower than the oxygenated basin. Review of the temperature data indicated that there was no change in temperature in the oxygenated region versus the control region which, in turn, supported the idea/theory that operation of the system of the present invention did not induce any turbulence or cause any additional mixing with the warmer waters in the thermocline. Data showed that both locations warmed at the same natural rate during the test period.

Aspects of the present invention can be used to dissolve any gas in solution and coalesce any undissolved gases to ensure that only dissolved gases in solution are discharged from the system. Aspects of the present invention can be used for any pumping system not just saturation technology. The present invention can provide a very low-cost pump suction and discharge solution to the current pump suction and discharge problems on the market.

Aspects of the present invention can be used to also inject other chemicals or agents into the water column, such as algicides or mechanisms to control phosphorus, like the addition of alum or ferrous based compounds as a coagulant to sequester.

Being a modular system, as shown in some of the exemplary embodiments above in FIGS. 7A through 8, the system can be upsized for larger applications.

Several systems have been tested and observations and further features have been made accordingly. Such features, as described in greater detail below, include (1) a design to eliminate warming of water as it is pumped through the system by deploying the system in the water body; (2) decreased energy cost; (3) anti-fouling management; (4) a deployable and recoverable application using a separate buoyancy pipe; (5) a small overall footprint (on land and in the body of water); (6) a shallow water adapter; (7) energy dissipation within the discharge header; and (8) integrated water quality monitoring feedback to automate system operation.

Such features can provide various benefits, including (1) reduced piping going from the lake to shore and back; (2) decreased pump size because the need is eliminated for net positive suction head (NPSH), the energy required to lift the water from the water's edge to the elevation of the pump and the pump gains the advantage of the hydrostatic pressure of the water above it; (3) longer distances are permitted between shore-based equipment the system location because it does not have to deal with the head loss from friction in the pipe to pump the water long distances; (4) the entire system can be located in the environment with respect to temperature that the system is trying to preserve; (5) the maintenance effort to keep the suction and discharge headers clean/free from bio fouling is decreased; (6) the discharge concentration is ensured to remain below the saturation threshold at depth for shallower applications; and (7) operating the system above threshold conditions that result in oxygen degassing can be prevented.

Preserving Thermal Conditions

It has been found that preserving thermal conditions is an important relevant parameter for successful system operation. It has been found that a temperature increase as little as a few tenths of a degree prevented the oxygen enriched water from blanketing the deeper sediments, where oxygen placement is desired the most.

For a shallow (<2 meter depth) application, the water was pumped a long distance, both through shallow (warmer water) and along the ground. Additionally, the chambers were located in an area that allowed for the water entering them to be warmed significantly, such as greater than 1.5 Celsius degrees. The housing and the chambers of the system absorbed and retained a significant amount of heat that was then transferred to the water being pumped through them. The results were that, as the oxygenated water returned to the discharge header, it immediately floated above the discharge header, resulting in oxygen addition occurring higher in the water column and not at the bottom. While this application did have an extreme case of warming, being greater than 1 Celsius degree, the circumstances were observed in other projects where there were only a few tenths of a degree warming.

One option to address this issue was to install a thermal barrier on the piping running along the shore and/or insulating and thermally controlling the environment the chambers were installed. Although this approach worked, it may not be feasible for many projects. Accordingly, as shown in FIG. 9, embodiments of the present invention can be designed where the entire apparatus to be deployed in the lake, so both the pump and the oxygen contact chambers sit on the bottom. In the embodiment of FIG. 9, an oxygen source 208 may be located on shore and can provide oxygen gas, via a weighted gas line 202, to the remainder of the system, deployed within the body of water 220.

A submersible pump 204 may be disposed within the body of water 220 to draw water from a suction header 200, pass the water through an oxygenation device 206, through a bubble capture system 214 (also referred to as bubble coalescing system 214) and out a discharge header 212. The oxygenation device 206, bubble capture system 214 can be similar to those embodiments described above. Similarly, the suction header 200 and the discharge header 212 can be similar to those described above. The system can include further modifications as discussed in greater detail below.

Preventing Oxygen De-Gassing

As systems were operated in shallower applications, the pump can be modified to move more water to dilute the discharge. This strategy was done to prevent discharging oxygen enriched water greater than dissolved oxygen (DO) saturation conditions at depth. As water is discharged greater than saturation at depth, the extra dissolved (oxygen) gas (originally under higher pressure) comes out of solution, driven by Henry's Law. As the oxygen degasses, it creates a steady flow of effervescent bubbles that rise through the water column to the surface. Rising bubbles entrain water and warms it as it carries it upward through the water column. One solution is to use different sized pumps for different depth applications. For the submerged pump application shown in FIG. 9, the chambers (oxygenation device 206 and BCS 214) can operate under a higher pressure and at a threshold water flow rate. This was done to optimize the amount of oxygen each base size system can add. Three base size systems can be provided, 12-inch, 18-inch, and 24-inch, for example. All systems can operate the same, in that the water flow rate was determined to ensure the downward velocity of the water in the BCS would not allow bubble entrainment and therefore carry over to the discharge pipe.

To manage the higher DO concentrations for the above design, there is a need for a way to dilute the oxygen enriched water before it discharged to the surrounding water. Referring to FIG. 10, rather than increase pumping capacity, which would be a detriment to BCS operation, a venturi-type nozzle 120 can be disposed in the discharge piping 122. The venturi-type nozzle 120 can be installed in a section of slotted pipe 124 to accommodate drawing surrounding water in, as shown by arrow 126, before the blended water discharges at the discharge header. The shallow water adapter can use the existing energy from the higher pump pressure operation to create a suction (as shown by arrow 126) as the water passes through the venturi-type nozzle 120, which, in turn, serves a dual purpose as it can dilute the over-saturated DO conditions relative to depth and it can dissipate some of the energy associated with the discharge flow.

Energy Dissipation

Part of what makes the system operate is creating the correct back pressure on the oxygen contact chamber assembly to promote the most favorable conditions for efficient oxygen gas dissolution into the water stream. In some embodiments, this can be conducted using a ball valve at the discharge header. The ball valve can be throttled until the desired back pressure and corresponding water flow rate was achieved. In place of the ball valve, an orifice design can provide an engineered restriction to achieve proper back pressure and corresponding water flow rate. The orifice, or engineered hole, could be modified with a bolt used as set screw to dial in pressure within, for example, 1 psi of a desired pressure. The orifice design uses Bernoulli's equation of water flow based on pressure differential through a known hole size relative to flow and pressure.

The engineered orifice can be used to set exact pressure to adequately operate the system; however, it may further create a different problem, where degassing can occur due to a large pressure drop across the orifice. It was found that pressure differences greater than 10 psi can result in such a turbulent discharge velocity that degassing can occur instantly. As discussed above, degassing is undesirable for several reasons, lost oxygen transfer, undesirable mixing, warming of the bottom waters, and oxygen being added higher in the water column, not at the bottom.

In keeping with the idea of using an orifice, an orifice pipe header 128 can be disposed within the discharge header 212 (see FIG. 9). The pipe inside the pipe can allow the distribution of the energy (pressure drop) over several smaller orifices 130 rather than one large one. By placing the orifice pipe header 128 inside the slotted pipe discharge header 212, the orifices 130 can be aligned with the header sections of threads, where sections of headers are connected, that do not have any slots. This can prevent localized jetting of high velocity water directly at/out slots in the discharger header 212. Using multiple orifices 130, a user can add or plug orifices to calibrate the system for proper back pressure. System testing proved successful, and no degassing was observed from the pressure drop across the orifice pipe header 128.

Maintenance/System Biofouling

Several systems were operated at much higher DO conditions than are traditionally observed. Historical aeration systems usually achieve oxygen levels in the water column in the range of 3-8 mg/L. For the system according to embodiments of the present invention, the operating parameters can be set to maintain between 15 and 20 mg/L in the bottom waters. At these higher DO levels, biofouling may be observed. Apparently, the oxygen enriched environment promotes significant growth. Raising the suction and discharge headers was cumbersome and labor intensive. As a result of this experience, embodiments of the present invention provide a method to float the headers in parallel and further embodiments add a passive anti-fouling screen formed of a copper mesh.

Referring to FIG. 12, a buoyancy line 140 is, for example, a second HDPE pipe tethered to the water pipes 142 and headers 144 that can be filled with water from shore to sink or voided using a compressor to float. Floating the system allows for quick and easy access that generally takes less than 60 seconds to raise, compared to the hour or longer to physically lift the pipes hand over hand to the headers.

In some embodiments, referring also to FIG. 13, the buoyancy line 140 can connect to a buoyancy ring 146 disposed about the oxygenation device 206, the pump 204 and the BCS 214, further permitting easy raising and lowering of these components along with the headers 144 the water pipes 142.

Because of the bio-fouling experience, a passive anti-fouling practice can be used which includes using a copper mesh 148 disposed about the headers 144 as illustrated in FIG. 15. The copper mesh 148 can be applied to the slotted sections of the headers 144 to prevent biological growth on the slots. It should be understood that, in FIG. 14, the openings in the headers 144 are not illustrated for clarity. Further, while a certain length of copper mesh 148 is illustrated, the length of the copper mesh 148 along the headers 144 may vary.

Sensor Integration and Automation

Because the saturation system has been observed to raise DO conditions to near saturation conditions at depth, it has been found that unmonitored operation may result in degassing. As the bulk water DO level increases, oxygen enriched water can be discharged, that is well above saturation levels at depth, into the already treated water. This may occur, for example, within days of operation. For smaller water bodies relative to the size of the system, it was observed the surpassing of operational limits within 24 hours.

A built-in safety can include at least one DO sensor 150 (see FIG. 9), placed in the target zone of oxygenation, that provides feedback to switch control (not shown). The data logger can then be programmed based on the desired operational range, for example, system on at 15 mg/L and off at 20 mg/L. In doing this, optimal performance can be ensured while reducing operating cost by shutting the system down when operation is not needed. The sensor 150 may be wired to a data logger, wired to a shore-based system that communicates with a data logger, or may wirelessly connect to a data logger, for example, by methods known in the art.

Referring to FIG. 14 Additionally, the programmable data logger can allow for control of a separate valve 160 on the discharge piping 162, which is connected to a nozzle 164 that points upward. This programmable valve 160 allows for intermittent or programmed operation to circulate oxygen-enriched water upwards. Since all water bodies are different, the valve 160 can be integrated into the automation based on user defined parameters, allowing for customized operation. Since the current design is engineered to not induce any mixing of the bottom waters, is has been found on several occasions thermal gradients can be established, which occur naturally. As a side note, this is proof that the system of the present invention, during its operation, is not inducing any mixing. Even though the water body is stratified, the bottom waters commonly have been observed to have a decreasing temperature gradient from the base of the thermocline to the bottom. When this gradient exceeds 0.5 Celsius degrees through the hypolimnion, the oxygen-enriched water being added near the bottom does not disperse upward. This follows the same dynamic of why oxygen-enriched water stays in the hypolimnion and does not mix above the thermocline; dispersion through the density gradient is highly restricted. It still occurs, but at such a slow rate it is nearly undetectable. Likewise, when a similar gradient exists in the bottom waters, it has been observed where minimal spreading (dispersion) of higher oxygen concentrations upward into the slightly warmer regions of the hypolimnion. The programmable valve 160 allows for more focused water injection, specifically designed to help overcome the hypolimnion temperature gradient.

A second function of the programmable discharge valve 160 is to help move oxygen enriched water upwards to aid in oxygenating the metalimnetic minimum. The metalimnetic minimum is often caused by the build-up of organic matter such as dead algae. This detritus builds up in the thermocline because of the density gradient. This is driven by Stokes Law, which governs the settling of particles through a media. The settling velocity of a particle is controlled by the difference between the density of the particle and that of the media (fluid) it is settling through. As detritus settles through the water column and the temperature decreases, it encounters higher density fluids. As the density increases, the corresponding settling velocity decreases. It has been observed that the settling velocity slows so much that a localized oxygen demand disproportionate to the rest of the water column occurs. This is common in most stratified water bodies, occurring following an algal bloom as the algae dies and settles through the water column. Usually, this phenomenon is observed at the end of the summer leading into fall. The challenge with the metalimnetic minimum is the anoxic band located at a mid-depth in the water column can result in a region of anoxic sediments, which in turn becomes a source of nutrients, such as phosphorus to the water column. This is the precise condition at the bottom that oxygenation systems are designed to mitigate. With an anoxic layer in mid-water column forming, the effectiveness of the oxygenation system is reduced relative to the overall water quality. Having the nozzle 164 in place allows for a user to promote enough mixing to disrupt the stagnant nature of the metalimnetic minimum.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A water treatment system for treating a body of water, comprising:

an intake header having a plurality of openings, permitting a predetermined maximum flow of water through the intake head;

a discharge header having a plurality of openings permitting an outflow predetermined maximum flow of water through the discharge header;

a pump drawing water from a water body through the intake header;

an oxygen contact chamber operable to oxygenate water flowing therethrough, the pump delivering water into the oxygen contact chamber, wherein the oxygen contact chamber has a conical shape; and a bubble capture system (BCS) receiving water from the oxygen contact chamber at an upper end thereof inside a housing, outflow being release from the BCS at a lower end of the housing, wherein:

the housing comprises a riser;

the pump, the oxygen contact chamber and the BCS are disposed in the body of water; and the bubble capture system and the riser minimize, prevent or eliminate gas bubbles in the outflow delivered back to the body of water via the discharge header.

2. The water treatment system of claim 1, wherein the pump, the oxygen contact chamber and the BCS are disposed in the body of water.

3. The water treatment system of claim 1, further comprising a buoyancy line attached to the intake header and the discharger header.

4. The water treatment system of claim 1, further comprising a buoyancy ring and a buoyancy line, wherein the buoyancy ring is: (i) fluidly connected to the buoyancy line and (ii) disposed about the pump, the oxygen contact chamber and the BCS.

5. The water treatment system of claim 1, wherein the oxygen contact chamber is disposed inside the BCS and an outflow from the oxygen contact chamber extends through a riser to a top of the BCS.

6. The water treatment system of claim 1, wherein the oxygen contact chamber is disposed inside a second housing within the housing of the BCS and an outflow from the oxygen contact chamber flows through holes disposed at a top end of the second housing.

7. The water treatment system of claim 1, wherein the oxygen contact chamber is disposed adjacent the BCS.

8. The water treatment system of claim 1, wherein the predetermined maximum flow is equal to or less than about 0.1 feet per second.

9. The water treatment system of claim 1, wherein the predetermined maximum flow results in a flow with a Reynolds number less than 50.

10. The water treatment system of claim 1, further comprising an orifice pipe wherein the orifice pipe has a plurality of orifices formed through the orifice pipe.

11. The water treatment system of claim 1, further comprising a venturi-type nozzle disposed in a discharge pipe of the discharge header, the venturi-type nozzle taking in water from the body of water to dilute the flow through the discharge pipe.

12. The water treatment system of claim 1, further comprising a valve disposed in a discharge pipe of the discharger header, the valve having a nozzle pointing upward toward an upper surface of the body of water, the valve operable to open to deliver a stream of oxygenated water upward through the body of water.

13. The water treatment system of claim 1, further comprising an oxygen sensor disposed in the body of water.

14. A water treatment system for treating a body of water, comprising:

an intake header having a plurality of openings, permitting a predetermined maximum flow of water through the intake head;

a discharge header having a plurality of openings permitting an outflow predetermined maximum flow of water through the discharger header;

a pump drawing water from a water body through the intake header;

an oxygen contact chamber operable to oxygenate water flowing therethrough, the pump delivering water into the oxygen contact chamber, wherein the oxygen contact chamber has a conical shape; and a bubble capture system (BCS) receiving water from the oxygen contact chamber at an upper end thereof inside a housing, outflow released from the BCS at a lower end of the housing and passed through the discharge header back to the water body, wherein:

the housing comprises a riser;

the predetermined maximum flow is either equal to or less than about 0.1 feet per second or the predetermined maximum flow results in a flow with a Reynolds number less than 50;

the pump, the oxygen contact chamber and the BCS are disposed in the body of water at a water level where the intake header and the discharger header are located; and the bubble capture system and the riser minimize, prevent or eliminate gas bubbles in the outflow delivered back to the body of water via the discharge header.

15. The water treatment system of claim 14, further comprising:

buoyancy ring and a buoyancy line, wherein the buoyancy ring is: (i) fluidly connected to the buoyancy line and (ii) disposed about the pump, the oxygen contact chamber and the BCS.

16. The water treatment system of claim 14, further comprising an orifice pipe wherein the orifice pipe has a plurality of orifices formed through the orifice pipe.

17. The water treatment system of claim 14, further comprising a venturi-type nozzle disposed in a discharge pipe of the discharge header, the venturi-type nozzle taking in water from the body of water to dilute the flow through the discharge pipe.

18. The water treatment system of claim 14, further comprising a valve disposed in a discharge pipe of the discharger header, the valve having a nozzle pointing upward toward an upper surface of the body of water, the valve operable to open to deliver a stream of oxygenated water upward through the body of water.

19. The water treatment system of claim 14, further comprising an oxygen sensor disposed in the body of water.

20. A method for oxygenating a water body without creating turbulence in the water column while minimizing sediment resuspension at a floor of the water body, the method comprising:

disposing the water treatment device of claim 1 in the water body;

permitting a predetermined maximum flow through a plurality of openings of the intake header;

drawing water from the water body via a pump through the intake header;

oxygenating water flowing through the oxygen contact chamber, the pump delivering water into the oxygen contact chamber;

receiving water from the oxygen contact chamber at an upper end of the bubble capture system (BCS) inside a housing thereof, an outflow being released from the BCS at a lower end of the housing; and delivering the outflow into the water body at a treatment level where the pump, the oxygen contact chamber and the BCS are located.

\* \* \* \* \*